United States Patent [19]
Corban

[11] 3,816,017
[45] June 11, 1974

[54] HOLE CUTTER FOR FILM COVERED PACKAGES

[76] Inventor: Claudiu Corban, c/o Tele-Sonic Trescott Division of Empsco, Inc., 1835 Thirty-Eighth St., Long Island City, N.Y.

[22] Filed: Jan. 2, 1973

[21] Appl. No.: 320,666

[52] U.S. Cl.......................... 408/19, 408/50, 408/53, 408/58, 408/68
[51] Int. Cl............................................ B23b 41/00
[58] Field of Search............ 408/19, 58, 56, 53, 68, 408/50; 53/48

[56] References Cited
UNITED STATES PATENTS

| | | | |
|---|---|---|---|
| 1,911,873 | 5/1933 | Balton | 408/68 X |
| 1,997,843 | 4/1935 | Warrell | 408/58 X |
| 3,228,145 | 1/1966 | Bryson | 408/68 |
| 3,417,540 | 12/1968 | Copping et al. | 53/48 |

*Primary Examiner*—Andrew R. Juhasz
*Assistant Examiner*—F. R. Bilinsky
*Attorney, Agent, or Firm*—Peter L. Tailer

[57] ABSTRACT

Arrays of articles packaged as a unit in shrink film or the like have holes cut in the film to allow the pricing of the individual articles while they are still packaged as a unit. The apparatus of this invention has a head with a bottom surface which drops on the film covered unit, the bottom surface containing annular depressions over each article. A cylindrical rotary cutter extends downward from the head within each annular depression. A vacuum is applied to apertures leading into the annular depressions within the circumferences of the rotary cutters to draw film upward into the annular depressions so that rotation of the cutters will cut holes in the film. The head is then removed from the unit, the vacuum is shut off, and jets blow disks of cut off film from below the head.

6 Claims, 6 Drawing Figures

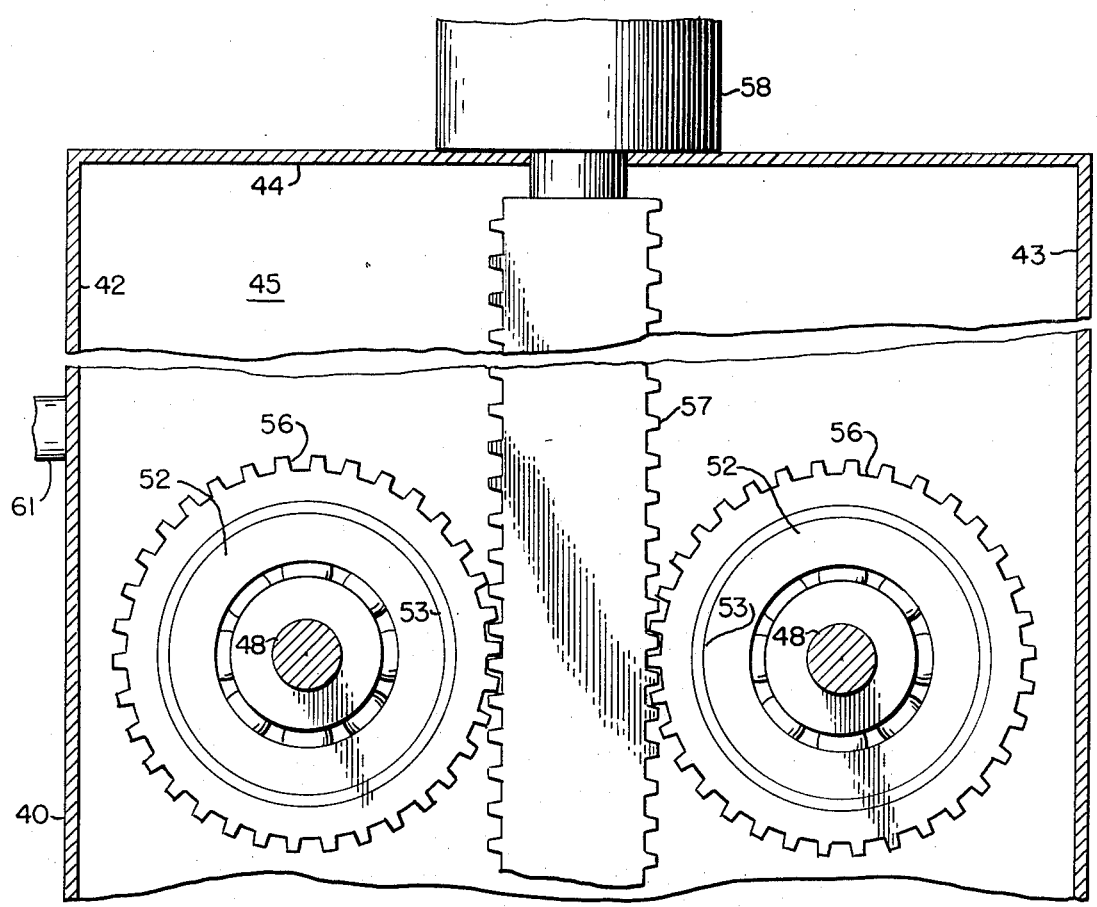
FIG. 4
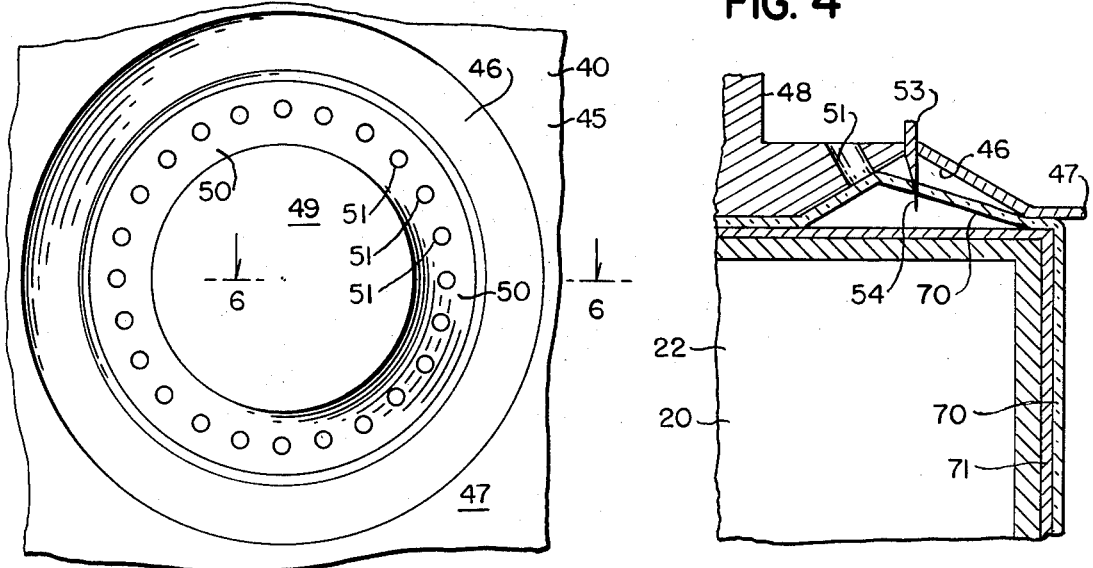
FIG. 5
FIG. 6

HOLE CUTTER FOR FILM COVERED PACKAGES

BACKGROUND OF THE INVENTION

Arrays of articles, such as bottles of vitamin pills, boxes of pharmaceuticals, boxes of comestibles, and the like are packaged in arrays as a unit in shrink film for ease in handling. Since individual retailers may put a different price on the same goods, the articles in each film packaged unit must be priced when they are delivered. This now requires retailers to open the shrink film packaged units and price the articles individually. This wastes time and leaves the separated articles to be stacked on the shelves. The apparatus of this invention cuts holes in the shrink film packaged units to form a hole over each article without damaging the articles in the process. The articles may then be priced in the packaged units through the holes.

SUMMARY OF THE INVENTION

The device of this invention has a head with a bottom surface, the head being consecutively dropped on arrays of articles packed as units in film or the like and passed on a conveyor under the head. The bottom surface of the head contains an annular depression to be disposed over each article in an array. The head has a cylindrical cutting knife extend downward into each annular depression and the bottom surface has vacuum apertures extending into each annular depression within the lower edge of each cutting knife. When the head is dropped on a unit, a vacuum is drawn in the apertures to suck the film away from the articles into the annular depressions and against the lower edges of the cutting knives. Each knife is rotatably mounted and rotated to cut a circular hole in the film. The disks of film thus cut off plug the vacuum apertures to conserve vacuum. The head is raised, the vacuum is shut off, and air is blown through jets under the head to blow away the cut off disks of film. The knives may have gears mounted on them to be rotated by the reciprocation of a rack gear, although other drives may be used.

The main advantages of this invention are that positive cutting of the film is ensured and that paper wrapped or delicate articles cannot be damaged by the knives. In addition, the vacuum drawing of the film into the annular depressions by vacuum applied to apertures within the circle of each knife greatly reduces the quantity of vacuum required in that the disks of film cut from the film covering of the units plug the vacuum apertures and continue to plug the vacuum apertures as the head is raised. The apparatus of this invention is fast, positive, safe, and sure in its operation.

BRIEF DESCRIPTION OF THE DRAWING

FIG. 4 is a horizontal section taken on line 4—4 of FIG. 1 with longitudinal portions of the head broken away and with the rack activating cylinder broken away;

FIG. 5 is a bottom view of a fragment of the head showing an annular depression therein; and FIG. 6 is a vertical section taken on line 6—6 of FIG. 5 showing a fragment of the head positioned on a fragment of a film covered article.

DESCRIPTION OF THE PREFERRED EMBODIMENT

Figure 2:
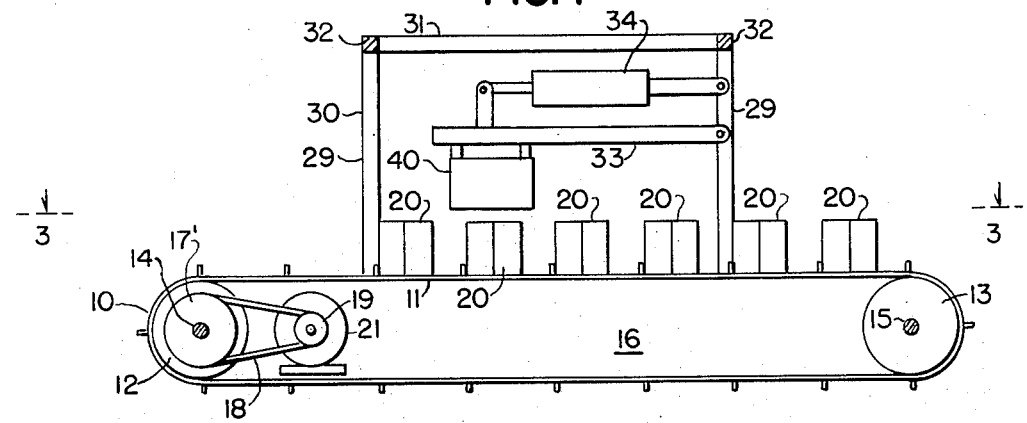
FIG. 2 is a vertical, longitudinal section through the apparatus of this invention taken on line 2—2 of FIG. 3.
Figure 3:
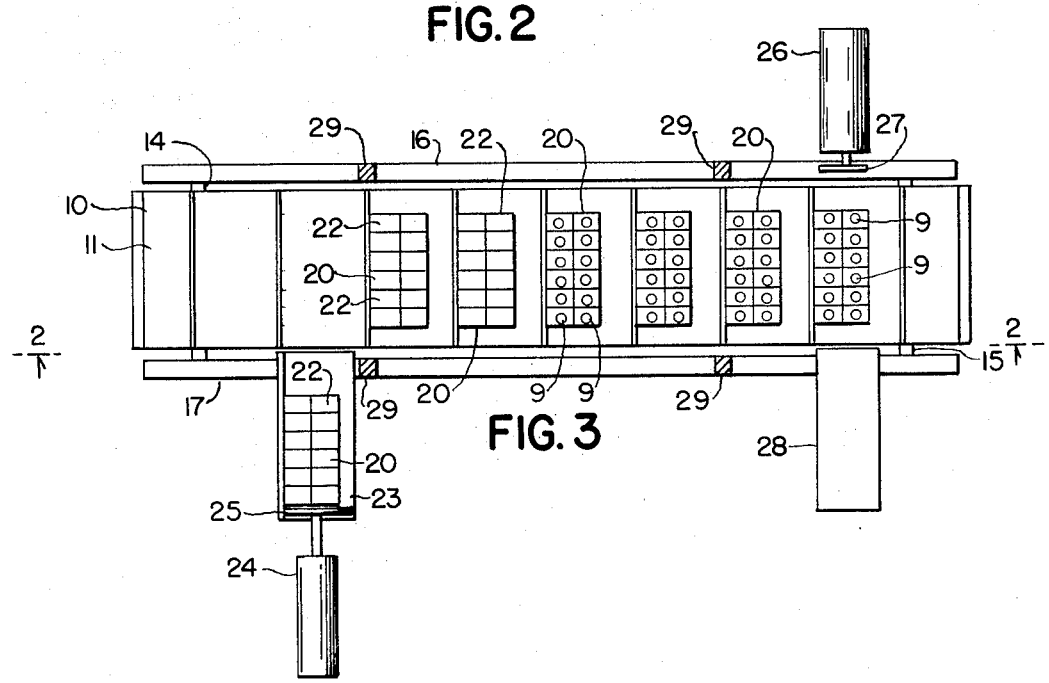
FIG. 3 is a horizontal section taken on line 3—3 of FIG. 2.

As shown in FIGS. 2 and 3, a conveyor 10 has a belt 11 extending about the drums 12 and 13 which are mounted on the axles 14 and 15 journalled in the side members 16 and 17. Shaft 14 has a pulley 17" mounted on it to be intermittently driven by belt or chain 18, pulley 19, and motor 21.

Referring now to FIG. 3, units 20 of arrays of articles 22 are packaged in shrink film or the like. The units 20 are delivered by conveyor equipment (not shown) onto tray 23. A cylinder 24 extends a ram 25 to push each unit 20 onto a station of conveyor 11. Another cylinder 26 extends a ram 27 to push units 20 from the conveyor 11 onto a delivery tray 28 from which they are removed.

Referring again to both FIGS. 2 and 3, four vertical supports 29 form a rectangular frame 30 with the longitudinal members 31 and the transverse members 32. A cutting head 40 is mounted on pivotally secured members 33 to be lowered and raised by means of cylinder 34 to rest on each of the units 20 as they come to rest while intermittently moving beneath it. The sequential activation of the elements of this invention may be accomplished by means well known in the art. For example, the contacting of microswitches by units 20 and other moving elements of the apparatus may be used to initiate subsequent operations. If desired, a central timing means (not shown) may be used to activate the elements of the invention in a desired sequence.

Thus when a unit 20 is delivered to tray 23 and conveyor belt 11 is empty adjacent thereto, cylinder 24 is activated to push a unit 20 onto belt 11. As head 40 has a unit 20 move thereunder and come to rest with the intermittent operation of motor 21, head 40 will be dropped on the unit 20 to carry out its sequence of operations and then be raised. As units 20 reach the end of belt 11, cylinder 26 is activated to remove them.

Referring now to FIGS. 1, 4, 5 and 6, the cutting head 40 has a top wall 41 fixed to front and rear walls 42 and 43 and side walls 44. A bottom wall 45 contains annular upward extending depressions 46 in its bottom surface 47. A support 48 extends downward from top wall 41 over each depression 46 and terminates in a flat bottom surface 49 having an upward sloping conical edge 50 which forms the inner side of each annular depression 46. Vacuum apertures 51 are formed in the edges 50 and communicate with the interior of head 40. A ball bearing 52 is fixed on each support 48 to rotatably mount a cylindrical cutting knife 53. Each knife 53 extends downward to project a cutting edge 54 downward into an angular depression 46. The cutting edges 54 of the knives 53 terminate well within the annular depressions 46. Openings 55 may be formed in the walls of the cylindrical knives 53 to allow free communication between the inside of head 40 and the vacuum apertures 51.

Gears 56 are mounted on each cylindrical knife 53 to be engaged by a rack gear 57 which is reciprocated by cylinder 58 fixed to a side wall 44. Thus activation of cylinder 58 will rotate the cutting knives 53.

Figure 1:
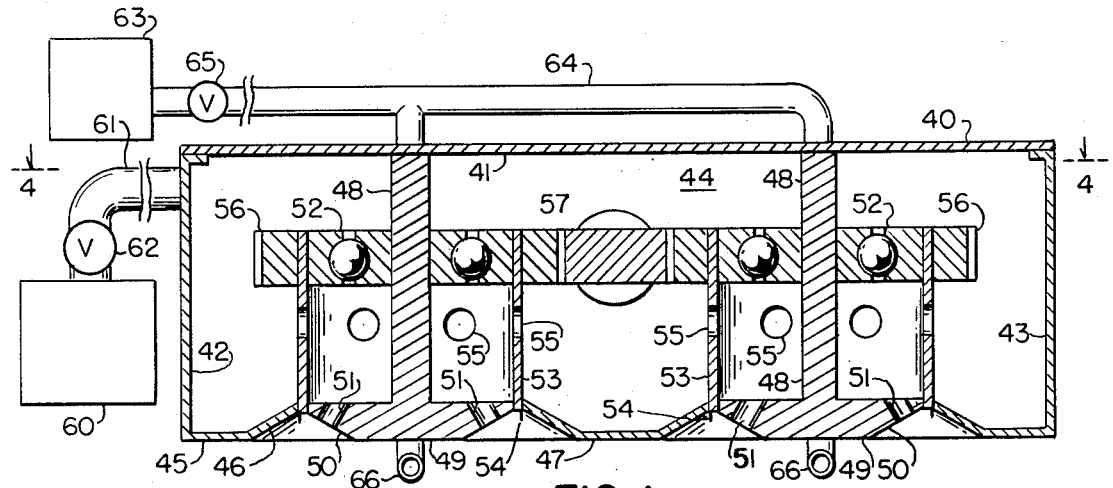
FIG. 1 is a longitudinal section through the head of the apparatus of this invention.

As shown in FIG. 1, a vacuum source, such as a vacuum tank 60, is connected by a flexible tube 61 to the interior of head 40 through a valve 62. An air pressure tank 63 is connected by flexible tubing 64 through valve 65 to the twin air jets 66 which are directed across the bottom of head 40 and the annular depressions 46.

Referring now to FIGS. 1 and 6, when head 40 drops on a unit 20, valve 62 opens in response to any suitable control means to draw a vacuum in head 40. As shown in FIG. 6, this vacuum sucks the film covering 70 about each article 22 up into the annular depressions 46. The cylinder 58 then reciprocates rack 57 to reciprocally rotate the knives through 420 degrees to cut plugs or disks of film 70 within each depression 46 to leave the apertures 9 as shown in FIG. 3. As they are cut, the disks of film 70 plug the vacuum apertures 51 conserving vacuum in tank 60 which would otherwise be lost. It is to be noted that even a paper covering 71 of an article 22 will not be cut by a knife 53 as it will not be flexible enough to be drawn up into a depression. Valve 62 is closed and head 40 is raised. Valve 65 is then opened so that the jets 66 will blow the cut off disks of film 70 from below head 40. The cycle is then repeated.

While this invention has been shown and described in the best form known, modifications may be made. For example, other means than the particular rack drive shown could be used to rotate the cylindrical knives 53. Head 40 may be resiliently fixed to arms 33 to accommodate itself to irregular units 20.

I claim:

1. Apparatus for cutting holes in film covered arrays of articles film covered to form a packaged unit, the apparatus cutting a hole in the film over each article in a unit, said apparatus comprising, in combination, a head, means intermittently moving film covered units under said head, means dropping said head on each of said units while said units are at rest and then raising said head from said units, a flat bottom surface of said head containing an annular depression over each article arrayed in said units, cylindrical knives rotatably mounted on said head and having cutting edges extend into each annular depression, said cutting edges of said knives being disposed above said flat bottom surface of said head, said annular depressions containing vacuum apertures disposed within said cylindrical knives, means drawing a vacuum in said vacuum apertures when said head rests on a unit drawing film into said annular depressions, and means rotating said cylindrical knives cutting disks from said film over each article in a packaged unit, disks cut from the film by said knives blocking said vacuum apertures conserving vacuum.

2. The combination according to claim 1 wherein said head has a closed interior and wherein said means drawing a vacuum in said vacuum apertures is a vacuum tank, and valve means connected between said vacuum tank and the interior of said head.

3. The combination according to claim 2 with the addition of air jets directed under said head blowing disks cut from film from under said head.

4. The combination according to claim 3 wherein said means intermittently moving said units under said head comprises an intermittently driven conveyor belt.

5. The combination according to claim 4 wherein said cylindrical knives have gears mounted thereon, said means rotating said cylindrical knives comprising a rack gear driving said gears, and a cylinder reciprocating said rack gear.

6. The combination according to claim 5 wherein said knives are rotated at least 360°.

* * * * *